US012800312B2

(12) United States Patent
Oto et al.

(10) Patent No.: US 12,800,312 B2
(45) Date of Patent: Nov. 17, 2026

(54) DOUBLE-ENDED TUNING FORK VIBRATOR, PHYSICAL QUANTITY SENSOR, AND INERTIAL MEASUREMENT DEVICE

(71) Applicant: SEIKO EPSON CORPORATION, Tokyo (JP)

(72) Inventors: Masayuki Oto, Okaya (JP); Kenta Sato, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 307 days.

(21) Appl. No.: 18/621,570

(22) Filed: Mar. 29, 2024

(65) Prior Publication Data

US 2024/0328785 A1 Oct. 3, 2024

(30) Foreign Application Priority Data

Mar. 31, 2023 (JP) ................................. 2023-057555

(51) Int. Cl.
*G01C 21/16* (2006.01)

(52) U.S. Cl.
CPC .................................... *G01C 21/16* (2013.01)

(58) Field of Classification Search
CPC ............................ G01C 21/16; G01C 19/5607
See application file for complete search history.

(56) References Cited

U.S. PATENT DOCUMENTS 4,469,979 A 9/1984 Chuang
4,757,228 A * 7/1988 Kalinoski ................ H03H 9/21 310/317
5,315,874 A 5/1994 Petrovich et al.
2011/0100125 A1* 5/2011 Sato ...................... G01P 15/097 73/514.29
2011/0259101 A1 10/2011 Sato
2013/0175897 A1 7/2013 Ohtsuka et al.

FOREIGN PATENT DOCUMENTS

JP S60-39911 A 3/1985
JP S64-29110 A 1/1989
JP S64-86608 A 3/1989
JP H4-361165 A 12/1992
JP 2007-187463 A 7/2007
JP 2008-306621 A 12/2008
JP 2009-68882 A 4/2009
JP 2010-74246 A 4/2010
JP 2010-286468 A 12/2010
JP 2011-59097 A 3/2011

(Continued)

*Primary Examiner* — Tarun Sinha

(74) *Attorney, Agent, or Firm* — Rankin, Hill & Clark LLP

(57) ABSTRACT

In a double-ended tuning fork vibrator, a pair of vibration beams having a pair of bases coupled to both ends have a first end region, a first excitation region, a first relay region, a second excitation region, a second relay region, a third excitation region, and a second end region in this order toward a first direction, and an interconnect coupling an excitation electrode in the first excitation region and an excitation electrode in the second excitation region and an interconnect coupling an excitation electrode in the first excitation region and an excitation electrode in the second excitation region are provided on a front surface of the first relay region.

11 Claims, 10 Drawing Sheets

(56) References Cited

FOREIGN PATENT DOCUMENTS

| | | | |
|---|---|---|---|
| JP | 2011-226941 | A | 11/2011 |
| JP | 2013-143651 | A | 7/2013 |
| JP | 2014-42242 | A | 3/2014 |
| JP | 2019-165357 | A | 9/2019 |
| JP | 2019-165358 | A | 9/2019 |

* cited by examiner

DOUBLE-ENDED TUNING FORK VIBRATOR, PHYSICAL QUANTITY SENSOR, AND INERTIAL MEASUREMENT DEVICE

The present application is based on, and claims priority from JP Application Serial Number 2023-057555, filed Mar. 31, 2023, the disclosure of which is hereby incorporated by reference herein in its entirety.

BACKGROUND

1. Technical Field

The present disclosure relates to a double-ended tuning fork vibrator, a physical quantity sensor, an inertial measurement device, and the like.

2. Related Art

JP-A-2014-42242 discloses a double-ended tuning fork vibrator including a pair of bases, two vibration beams disposed parallel to each other between the pair of bases and each having a front surface, a back surface, and both side surfaces, and a plurality of excitation electrodes provided at surfaces of three excitation regions of the vibration beams divided in a length direction.

JP-A-2014-42242 is an example of the related art.

In the double-ended tuning fork vibrator disclosed in JP-A-2014-42242, in order to reduce a vibration leakage from the vibration beam to the base, when an excitation electrode is disposed at a distance from both ends of the vibration beam, it is necessary to make the interconnect coupling the excitation electrode, a pad, and the like difficult to disconnect.

SUMMARY

One aspect of the present disclosure relates to a double-ended tuning fork vibrator including:

when three directions orthogonal to one another are defined as a first direction, a second direction, and a third direction, a first base and a second base; and a first vibration beam extending in the first direction, and a second vibration beam extending in the first direction and disposed side by side with the first vibration beam in the second direction, in which the first base is coupled to one end of the first vibration beam and one end of the second vibration beam, the second base is coupled to the other end of the first vibration beam and the other end of the second vibration beam, each of the first vibration beam and the second vibration beam has a first end region, a first excitation region, a first relay region, a second excitation region, a second relay region, a third excitation region, and a second end region in this order toward the first direction, a plurality of excitation electrodes provided at the first vibration beam and the second vibration beam are selectively disposed on surfaces of the first excitation region, the second excitation region, and the third excitation region, and when one surface of each of the first vibration beam and the second vibration beam orthogonal to the third direction is a front surface and the other surface is a back surface, a third interconnect coupling a first excitation electrode disposed in the first excitation region and a second excitation electrode disposed in the second excitation region and a fourth interconnect coupling a third excitation electrode disposed in the first excitation region and a fourth excitation electrode disposed in the second excitation region are provided on a front surface of the first relay region, a seventh interconnect coupling the second excitation electrode and a fifth excitation electrode disposed in the third excitation region and an eighth interconnect coupling the fourth excitation electrode and a sixth excitation electrode disposed in the third excitation region are provided on a front surface of the second relay region, a fifth a seventh interconnect coupling excitation electrode disposed in the first excitation region and an eighth excitation electrode disposed in the second excitation region and a sixth interconnect coupling a ninth excitation electrode disposed in the first excitation region and a tenth excitation electrode disposed in the second excitation region are provided on a back surface of the first relay region, and a ninth interconnect: coupling the eighth excitation electrode and an eleventh excitation electrode disposed in the third t excitation region and a tenth interconnect coupling the tenth excitation electrode and a twelfth excitation electrode disposed in the third excitation region are provided on a back surface of the second relay region.

Another aspect of the present disclosure relates to a physical quantity sensor including: the double-ended tuning fork vibrator described above; a fixed portion coupled to one end side of the double-ended tuning fork vibrator described above; a movable portion coupled to the other end side of the double-ended tuning fork vibrator described above; and a support supporting the fixed portion.

Another aspect of the present disclosure relates to an inertial measurement device including: a processor configured to process a detection signal output from the physical quantity sensor described above.

DESCRIPTION OF EMBODIMENTS

Hereinafter, the embodiment will be described. The embodiment to be described below does not unduly limit the scope of the claims. Not all configurations described in the embodiment are essential components.

1. Double-Ended Tuning Fork Vibrator

Figure 1:
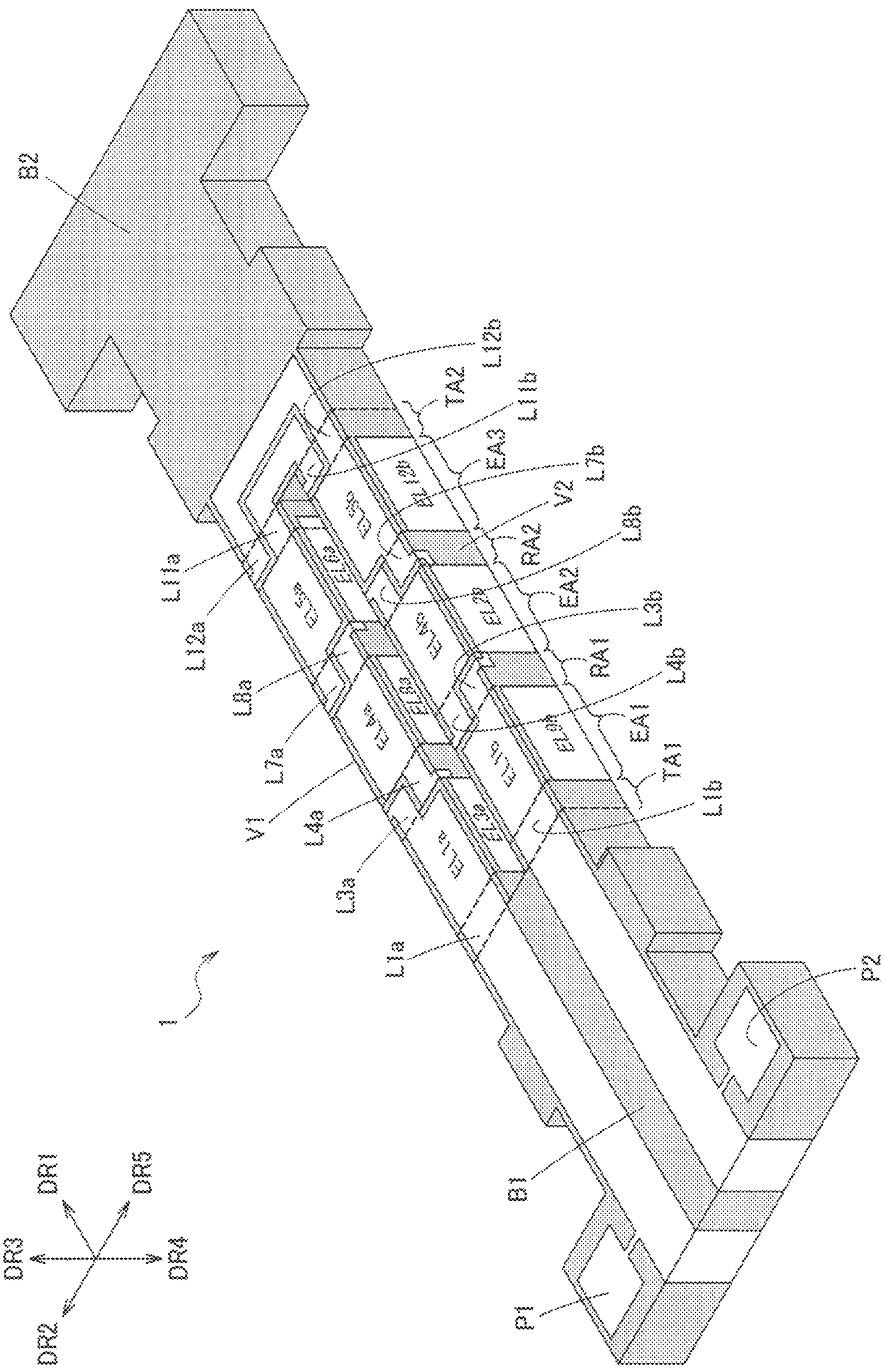
FIG. 1 is a perspective view of a first configuration example of a double-ended tuning fork vibrator according to the embodiment.

FIG. 1 shows a first configuration example of a double-ended tuning fork vibrator 1 according to the embodiment. FIG. 1 is a perspective view showing the first configuration example of the double-ended tuning fork vibrator 1.

As shown in FIG. 1, the double-ended tuning fork vibrator 1 includes a first base B1 and a second base B2 as a pair of bases, and a first vibration beam V1 and a second vibration beam V2 as a pair of vibration beams extending in a first direction DR1 and provided side by side in a second direction DR2 orthogonal to the first direction DR1. The first direction DR1 and the second direction DR2 are directions orthogonal to each other in a main surface of the double-ended tuning fork vibrator 1 shown in FIG. 1. A third direction DR3 is a direction orthogonal to the first direction DR1 and the second direction DR2 and is a thickness direction of the main surface of the double-ended tuning fork vibrator 1 shown in FIG. 1 from a back surface side to a front surface side. A fourth direction DR4 is an opposite direction of the third direction DR3. A fifth direction DR5 is an opposite direction of the second direction DR2. The first direction DR1 is, for example, a Y-axis direction. The second direction DR2 is, for example, an X-axis direction. The third direction DR3 is, for example, a Z-axis direction.

The base B2 is provided at the first direction DR1 of the base B1. One end of the vibration beam V1 is coupled to the base B1, the vibration beam V1 extends therefrom in the first direction DR1, and the other end of the vibration beam V1 is coupled to the base B2. The vibration beam V2 is disposed at the fifth direction DR5 of the vibration beam V1. One end of the vibration beam V2 is coupled to the base B1, the vibration beam V2 extends therefrom in the first direction DR1, and the other end of the vibration beam V2 is coupled to the base B2.

Hereinafter, a plan view is referred to as viewing from the third direction DR3, and a cross-sectional view is referred to as viewing from the first direction DR1 or the second direction DR2. A surface when the vibration beams V1 and V2 shown in FIG. 1 are viewed from the third direction DR3 is referred to as a front surface. A surface when the vibration beams V1 and V2 are viewed from the fourth direction DR4 is referred to as a back surface. Of side surfaces of the vibration beams V1 and V2, side surfaces facing each other in the second direction DR2 are referred to as inner side surfaces, and side surfaces not facing each other are referred to as outer side surfaces. The inner side surface and the outer side surface are also collectively referred to as side surfaces.

Each of the vibration beams V1 and V2 of the double-ended tuning fork vibrator 1 includes a first end region TA1, a first excitation region EA1, a first relay region RA1, a second excitation region EA2, a second relay region RA2, a third excitation region EA3, and a second end region TA2 in this order in a direction in which the vibration beam extends, that is, toward the first direction DR1. The first end region TA1, the first excitation region EA1, the first relay region RA1, the second excitation region EA2, the second relay region RA2, the third excitation region EA3, and the second end region TA2 are not physically separated regions in the vibration beams V1 and V2, but are regions set as arrangement regions for excitation electrodes, interconnects, and the like. The base B1 is provided with pads P1 and P2 as coupling terminals.

In the double-ended tuning fork vibrator 1, as will be described later with reference to FIG. 2, a voltage is applied to the vibration beams V1 and V2 by the excitation electrodes provided at the surfaces of the vibration beams V1 and V2, and the vibration beams V1 and V2 are deformed by a piezoelectric effect. Each of the excitation electrodes is coupled to a drive circuit via the pads P1 and P2, and the drive circuit applies a drive signal to the excitation electrode, so that the vibration beams V1 and V2 vibrate at a predetermined oscillation frequency.

The vibration beams V1 and V2 can be made of a member having a piezoelectric effect, for example, quartz crystal. As shown in FIG. 1, the base B1 is coupled to the one end of each of the vibration beams V1 and V2, and the base B2 is coupled to the other end of each of the vibration beams V1 and V2. That is, the pair of vibration beams V1 and V2 are provided so that both the ends thereof are coupled to the pair of bases B1 and B2. Both the vibration beams V1 and V2 and the bases B1 and B2 are formed of a material such as quartz crystal in a monolithic manner.

The pads P1 and P2 are provided, for example, at a front surface of the base B1 at a third direction DR3 side.

Figure 2:
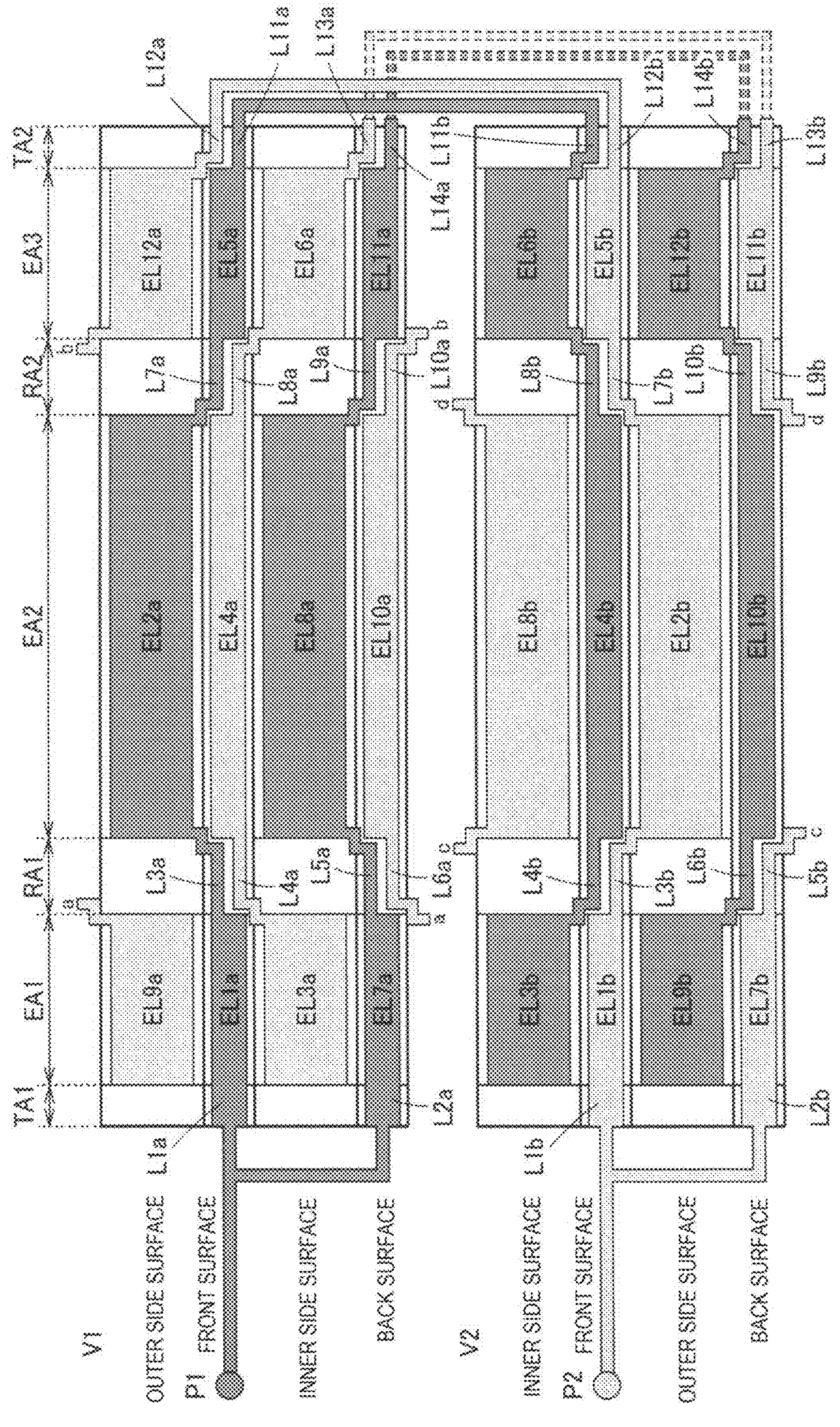
FIG. 2 is a developed view showing an interconnect relationship in the first configuration example of the double-ended tuning fork vibrator according to the embodiment.
Figure 6:
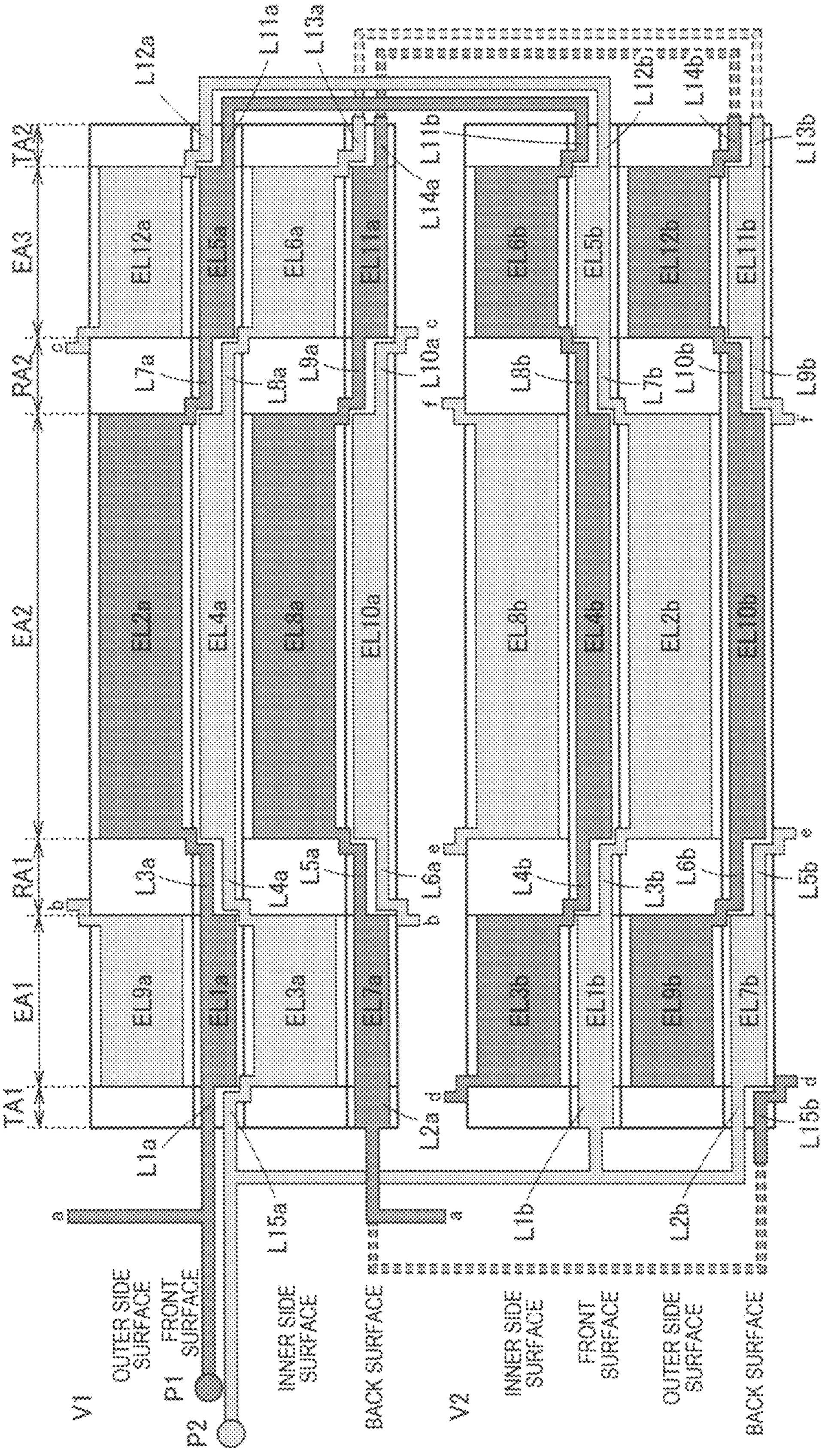
FIG. 6 is a developed view showing an interconnect relationship in the second configuration example of the double-ended tuning fork vibrator according to the embodiment.

FIG. 2 is a diagram showing the vibration beams V1 and V2 in the first configuration example shown in FIG. 1 as a developed view. Here, the developed view of FIG. 2 is a view showing a coupling relationship between the excitation electrodes provided at the surfaces of the vibration beams V1 and V2, and schematically shows dimensions and the like of the first excitation region EA1, the first relay region RA1, the first end region TA1, the second excitation region EA2, the second relay region RA2, the second end region TA2, the third excitation region EA3, the excitation electrodes, the interconnects, and the like. Regarding the bases B1 and B2 provided at both the ends of the vibration beams V1 and V2, only the interconnects are schematically shown. For example, "a" written on an end of an interconnect L6*a* at the back surface of the vibration beam V1 and an end of an interconnect extending from an excitation electrode EL9*a* at the outer side surface means that both ends are coupled to each other. The same applies to b, c, and d. The same applies to developed views shown in FIGS. 3, 4, and 6 to be described later.

The excitation electrodes are provided in the first excitation region EA1, the second excitation region EA2, and the third excitation region EA3. Specifically, for the vibration beam V1, at surfaces of the first excitation region EA1, excitation electrodes EL1*a*, EL7*a*, EL3*a*, and EL9*a* are respectively provided at the front surface, the back surface, the inner side surface, and the outer side surface. At surfaces of the second excitation region EA2, excitation electrodes EL4*a*, EL10*a*, EL8*a*, and EL2*a* are respectively provided at the front surface, the back surface, the inner side surface, and the outer side surface. At surfaces of the third excitation region EA3, excitation electrodes EL5*a*, EL11*a*, EL6*a*, and EL12*a* are respectively provided at the front surface, the back surface, the inner side surface, and the outer side surface.

For the vibration beam V2, at surfaces of the first excitation region EA1, excitation electrodes EL1*b*, EL7*b*, EL3*b*, and EL9*b* are respectively provided at the front surface, the back surface, the inner side surface, and the outer side surface. At surfaces of the second excitation region EA2, excitation electrodes EL4*b*, EL10*b*, EL8*b*, and EL2*b* are respectively provided at the front surface, the back surface, the inner side surface, and the outer side surface. At surfaces of the third excitation region EA3, excitation electrodes EL5*b*, EL11*b*, EL6*b*, and EL12*b* are respectively provided at the front surface, the back surface, the inner side surface, and the outer side surface.

The first relay region RA1 is a region coupling the first excitation region EA1 and the second excitation region EA2 at each of the vibration beams V1 and V2. Interconnects for coupling the excitation electrodes are provided at a front surface and a back surface of the first relay region RA1.

As shown in FIG. 2, at the vibration beam V1, at the front surface of the first relay region RA1, an interconnect L3*a*, which couples the excitation electrode EL1*a* provided in the first excitation region EA1 and the excitation electrode EL2*a* provided in the second excitation region EA2, and an interconnect L4*a*, which couples the excitation electrode EL3*a* provided in the first excitation region EA1 and the excitation electrode EL4*a* provided in the second excitation region EA2, are provided. At the back surface of the first relay region RA at the vibration beam V1, an interconnect L5*a*, which couples the excitation electrode EL7*a* provided in the first excitation region EA1 and the excitation electrode EL8*a* provided in the second excitation region EA2, and an interconnect L6*a*, which couples the excitation electrode EL9*a* provided in the first excitation region EA1 and the excitation electrode EL10*a* provided in the second excitation region EA2, are provided.

As shown in FIG. 2, at the vibration beam V2, at the front surface of the first relay region RA1, an interconnect L3*b*, which couples the excitation electrode EL1*b* provided in the first excitation region EA1 and the excitation electrode EL2*b* provided in the second excitation region EA2, and an interconnect L4*b*, which couples the excitation electrode EL3*b* provided in the first excitation region EA1 and the excitation electrode EL4*b* provided in the second excitation region EA2, are provided. At the back surface of the first relay region RA1 at the vibration beam V2, an interconnect L5*b*, which couples the excitation electrode EL7*b* provided in the first excitation region EA1 and the excitation electrode EL8*b* provided in the second excitation region EA2, and an interconnect L6*b*, which couples the excitation electrode EL9*b* provided in the first excitation region EA1 and the excitation electrode EL10*b* provided in the second excitation region EA2, are provided.

The interconnects at the front surface of the first relay region RA1 have a similar thickness, and are provided parallel to each other along a length direction of the vibration beams V1 and V2. The interconnects at the back surface of the first relay region RA1 have a similar thickness and are disposed side by side. For example, an area of the front surface of the first relay region RA1 in the vibration beam V1 is divided such that an area of a portion occupied by the interconnect L3*a* and an area of a portion occupied by the interconnect L4*a* are each approximately ½. Thus, of the interconnect La and the interconnect L4*a*, one interconnect occupies most of the area of the front surface of the first relay region RA1, and the other interconnect is arranged not to be provided at an edge of the vibration beam V1. The interconnects L3*a* and L4*a* do not cover the edge of the vibration beam V1 in a region extending along the length direction of the vibration beam V1. The same applies to the interconnects La and L6*a* provided at the back surface of the first relay region RA1 of the vibration beam V1.

The second relay region RA2 is a region coupling the second excitation region EA2 and the third excitation region EA3 at each of the vibration beams V1 and V2. Interconnects for coupling the excitation electrodes are provided at a front surface and a back surface of the second relay region RA2 similarly to the first relay region RA1.

As shown in FIG. 2, at the vibration beam V1, at the front surface of the second relay region RA2, an interconnect L7*a*, which couples the excitation electrode EL2*a* provided in the second excitation region EA2 and the excitation electrode EL5*a* provided in the third excitation region EA3, and an interconnect L8*a*, which couples the excitation electrode EL4*a* provided in the second excitation region EA2 and the excitation electrode EL6*a* provided in the third excitation region EA3, are provided. At the back surface of the second relay region RA2 at the vibration beam V1, an interconnect L9*a*, which couples the excitation electrode EL8*a* provided in the second excitation region EA2 and the excitation electrode EL11*a* provided in the third excitation region EA3, and an interconnect L10*a*, which couples the excitation electrode EL10*a* provided in the second excitation region EA2 and the excitation electrode EL12*a* provided in the third excitation region EA3, are provided.

As shown in FIG. 2, at the vibration beam V2, at the front surface of the second relay region RA2, an interconnect L7*b*, which couples the excitation electrode EL2*b* provided in the second excitation region EA2 and the excitation electrode EL5*b* provided in the third excitation region EA3, and an interconnect L8*b*, which couples the excitation electrode EL4*b* provided in the second excitation region EA2 and the excitation electrode EL6*b* provided in the third excitation region EA3, are provided. At the back surface of the second relay region RA2 at the vibration beam V2, an interconnect L9*b*, which couples the excitation electrode EL8*b* provided in the second excitation region EA2 and the excitation electrode EL11*b* provided in the third excitation region EA3, and an interconnect L10*b*, which couples the excitation electrode EL10*b* provided in the second excitation region EA2 and the excitation electrode EL12*b* provided in the third excitation region EA3, are provided.

The interconnects at the front surface of the second relay region RA2 have a similar thickness and are provided in parallel to each other along the length direction of the vibration beams V1 and V2. The same applies to the back surface of the second relay region RA2. For example, the interconnects La and L8*a* in the second relay region RA2 of the vibration beam V1 do not cover the edge of the vibration beam V1 in a region extending along the length direction of the vibration beam V1. The same applies to the interconnects L9*b* and L10*b* provided at the back surface of the second relay region RA2 of the vibration beam V2.

As shown in FIG. 1, the first end region TA1 is a region provided between the first excitation region EA1 and the base B1 and coupled to the base B1. The second end region TA2 is a region provided between the third excitation region EA3 and the base B2 and coupled to the base B2.

In the embodiment, interconnects are provided at the front surface and the back surface of the first end region TA1 and the second end region TA2. As shown in FIGS. 1 and 2, widths of an interconnect L1*a*, an interconnect L2*a*, an interconnect L1*b*, and an interconnect L2*b* are equal to widths of the excitation electrode EL1*a*, the excitation electrode EL7*a*, the excitation electrode EL1*b*, and the excitation electrode EL7*b* that are continuous at a first direction DR1 side. Here, interconnect widths of the interconnect L1*a*, the interconnect L2*a*, the interconnect L1*b*, and the interconnect L2*b* may not be completely equal to the widths of the excitation electrode EL1*a*, the excitation electrode EL7*a*, the excitation electrode EL1*b*, and the excitation electrode EL7*b* to which the interconnects are coupled at the first direction DR1 side, and but may be approximately the same. The excitation electrode and the interconnect are not provided at each of an inner side surface and an outer side surface of the first end region TA1 and the second end region TA2, and the entire side surfaces are exposed. Here, "the entire side surfaces are exposed" means that no conductor is formed at each of the side surfaces of the first end region TA1 and the second end region TA2 so that an electric field that substantially causes a piezoelectric effect cannot be applied to each of the first end region TA1 and the second end region TA2. Accordingly, a conductor may be present on the side surface in each of the first end region TA1 and the second end region TA2 to an extent that substantially no electric field is generated.

For example, in the first end region TA1, the interconnect L1*a* coupling the excitation electrode EL1*a* and the pad P1 is provided at the front surface of the vibration beam V1 with the same interconnect width as that of the excitation electrode EL1*a*. At the back surface of the vibration beam V1, as shown in the developed view of FIG. 2, the interconnect L2*a* coupling the excitation electrode EL7*a* and the pad P1 is provided with the same interconnect width as that of the excitation electrode EL7*a*. No excitation electrode or interconnect conductor is provided at the inner side surface and the outer side surface. Similarly, at the vibration beam V2, the interconnect L1*b* coupling the excitation electrode EL1*b* and the pad P2 is provided at the front surface, the interconnect L2*b* coupling the excitation electrode EL7*b* and the pad P2 is provided at the back surface, the interconnect L1*b* and the interconnect L2*b* having the same interconnect width as the excitation electrodes EL1*b* and EL7*b*, and no excitation electrode or interconnect is provided at the inner side surface and the outer side surface.

In the second end region TA2, as shown in FIG. 2, an interconnect L11*a* coupling the excitation electrode EL5*a* and the excitation electrode EL6*b* and an interconnect L12*a* coupling the excitation electrode EL12*a* and the excitation electrode EL5*b* are provided at the front surface of the vibration beam V1. Here, the interconnect L11*a* and the interconnect L12*a* are electrically coupled to each other by an interconnect passing through the base B2. An interconnect L13*a* coupling the excitation electrode EL6*a* and the excitation electrode EL11*b* and an interconnect L14*a* coupling the excitation electrode EL11*a* and the excitation electrode EL12*b* are provided at the back surface of the vibration beam V1. The interconnect L13*a* and the interconnect L14*a* are also electrically coupled to each other by an interconnect passing through the base B2.

Here, the interconnects provided at the front surface and the back surface of the second end region TA2 of the vibration beams V1 and V2 are provided side by side at the front surface or the back surface of the second end region TA2, similarly to the interconnects of the first relay region RA1 and the second relay region RA2, and are provided so that either one of the interconnects does not become a thin interconnect pattern. The interconnects are provided in a region extending along the length direction of the vibration beams V1 and V2 so as not to cover edges of the vibration beams V1 and V2.

Thus, the excitation electrodes are provided at the surfaces of the vibration beams V1 and V2 of the double-ended tuning fork vibrator 1, but the excitation electrodes are not provided at all surfaces. That is, the plurality of excitation electrodes provided in the double-ended tuning fork vibrator 1 are selectively disposed at the surfaces of the first excitation region EA1, the second excitation region EA2, and the third excitation region EA3, not in the first end region TA1, the first relay region RA1, the second relay region RA2, and the second end region TA2.

As described above, the vibration beams V1 and V2 of the double-ended tuning fork vibrator 1 vibrate according to an AC voltage applied from the pads P1 and P2. Specifically, the AC voltage is applied from the pads P1 and P2 so that a phase of the AC voltage changes by 180° between the second excitation region EA2 corresponding to an antinode of a vibration of the vibration beams V1 and V2 and the first excitation region EA1 and the third excitation region EA3.

In this way, at the vibration beam V1, an electric field in an opposite direction is applied to the second excitation region EA2 corresponding to the antinode of the vibration, the first excitation region EA1, and the third excitation region EA3. Accordingly, at the vibration beam V1, a vibration is induced in which the second excitation region EA2 becomes the antinode of the vibration and both ends of the vibration beam V1 become nodes of the vibration. At the vibration beam V2, an electric field in an opposite direction is applied to the second excitation region EA2 corresponding to the antinode of the vibration, the first excitation region EA1, and the third excitation region EA3. Accordingly, at the vibration beam V2 as well, a vibration, in which the second excitation region EA2 becomes an antinode of the vibration and both ends of the vibration beam V2 become nodes of the vibration, is induced.

In the second excitation region EA2, electric fields of opposite polarities are applied to the vibration beam V1 and the vibration beam V2, and in the first excitation region EA1 and the third excitation region as well, electric fields of opposite polarities are applied to the vibration beam V1 and the vibration beam V2, so that vibrations induced in the vibration beam V1 and the vibration beam V2 have opposite phases. By applying an AC voltage so as to induce vibrations in opposite phases in the pair of vibration beams V1 and V2 thus, stable vibrations are induced in the vibration beams V1 and V2 without releasing a stress generated by a piezoelectric effect to an outside.

The double-ended tuning fork vibrator 1 includes: the pair of bases B1 and B2; and the pair of vibration beams V1 and V2 extending in the first direction DR1 and provided side by side in the second direction DR2 orthogonal to the first direction DR1. Both the ends of the pair of the vibration beams V1 and V2 are coupled to the pair of bases B1 and B2. The pair of vibration beams V1 and V2 have the first end region TA1, the first excitation region EA1, the first relay region RA1, the second excitation region EA2, the second relay region RA2, the third excitation region EA3, and the second end region TA2 in this order toward the first direction DR1. The plurality of excitation electrodes provided at the vibration beams V1 and V2 are selectively disposed at surfaces of the first excitation region EA1, the second excitation region EA2, and the third excitation region EA3. For the plurality of excitation electrodes, when surfaces of the vibration beams V1 and V2 when viewed from the third direction DR3 orthogonal to the first direction DR1 and the second direction DR2 are the front surfaces and surfaces when viewed from the fourth direction DR4 that is an opposite direction of the third direction DR3 are the back surfaces, the interconnect L3*a* coupling the excitation electrode EL1*a* in the first excitation region EA1 and the excitation electrode EL2*a* in the second excitation region EA2 and the interconnect L4a coupling the excitation electrode EL3a in the first excitation region EA1 and the excitation electrode EL4a in the second excitation region EA2 are provided at the front surface of the first relay region RA1. The interconnect L7a coupling the excitation electrode EL2a in the second excitation region EA2 and the excitation electrode EL5a in the third excitation region EA3 and the interconnect L8a coupling the excitation electrode EL4a in the second excitation region EA2 and the excitation electrode EL6a in the third excitation region EA3 are provided at the front surface of the second relay region RA2. The interconnect L5a coupling the excitation electrode EL7a in the first excitation region EA1 and the excitation electrode EL8a in the second excitation region EA2 and the interconnect L6a coupling the excitation electrode EL9a in the first excitation region EA1 and the excitation electrode EL10a in the second excitation region EA2 are provided at the back surface of the first relay region RA1. The interconnect L9a coupling the excitation electrode EL8a in the second excitation region EA2 and the excitation electrode EL11a in the third excitation region EA3 and the interconnect L10a coupling the excitation electrode EL10a in the second excitation region EA2 and the excitation electrode EL12a in the third excitation region EA3 are provided at the back surface of the second relay region RA2.

According to the embodiment, both the ends of the pair of vibration beams V1 and V2 are coupled to the pair of bases B1 and B2, so that the pair of vibration beams V1 and V2 can vibrate as the double-ended tuning fork vibrator 1. In this way, the interconnect coupled from the excitation electrode EL1a in the first excitation region EA1 to the excitation electrode EL2a in the second excitation region EA2 is coupled from the front surface of the vibration beam V1 to the outer side surface of the vibration beam V1, and the interconnect coupled from the excitation electrode EL3a in the first excitation region EA1 to the excitation electrode EL4a in the second excitation region EA2 is coupled from the inner side surface of the vibration beam V1 to the front surface of the vibration beam V1. Therefore, the interconnect L3a and the interconnect L4a can be provided side by side at the front surface of the first relay region RA1.

The interconnect L7a coupled from the excitation electrode EL2a in the second excitation region EA2 to the excitation electrode EL5a in the third excitation region EA3 is coupled from the outer side surface of the vibration beam V1 to the front surface of the vibration beam V1. The interconnect L8a coupled from the excitation electrode EL4a in the second excitation region EA2 to the excitation electrode EL6a in the third excitation region EA3 is coupled from the front surface of the vibration beam V1 to the inner side surface of the vibration beam V1. Therefore, the interconnect L7a and the interconnect L8a can be provided side by side at the front surface of the second relay region RA2.

The interconnect L5a coupled from the excitation electrode EL7a in the first excitation region EA1 to the excitation electrode EL8a in the second excitation region EA2 is coupled from the back surface of the vibration beam V1 to the inner side surface of the vibration beam V1. The interconnect L6a coupled from the excitation electrode EL9a in the first excitation region EA1 to the excitation electrode EL10a in the second excitation region EA2 is coupled from the outer side surface of the vibration beam V1 to the back surface of the vibration beam V1. Therefore, the interconnect La and the interconnect La can be provided side by side at the back surface of the first relay region RA1.

The interconnect L9a coupled from the excitation electrode EL8a in the second excitation region EA2 to the excitation electrode EL11a in the third excitation region EA3 is coupled from the inner side surface of the vibration beam V1 to the back surface of the vibration beam V1. The interconnect L10a coupled from the excitation electrode EL10a in the second excitation region EA2 to the excitation electrode EL12a in the third excitation region EA3 is coupled from the back surface of the vibration beam V1 to the outer side surface of the vibration beam V1. Therefore, the interconnect L9a and the interconnect L10a can be provided side by side at the back surface of the second relay region RA2.

Therefore, when a plurality of interconnects for coupling the excitation electrodes are provided at the front surface and the back surface of the first relay region RA1 and the front surface and the back surface of the second relay region RA2, it is possible to dispose the excitation electrodes on the surfaces of the first excitation region EA1, the second excitation region EA2, and the third excitation region EA3 while avoiding thinning of any one of the interconnects. Accordingly, when an interconnect pattern is formed in the first relay region RA1 or the second relay region RA2 by photolithography, it is possible to avoid a problem in which a thin interconnect pattern is not accurately formed due to an influence of reflection of light or the like and the interconnect is disconnected.

As shown in FIG. 2, the excitation electrode EL1a, the excitation electrode EL2a, . . . , and the excitation electrode EL12a are also respectively referred to as a first excitation electrode, a second excitation electrode, and a twelfth excitation electrode. The excitation electrode EL1b, the excitation electrode EL2b, . . . , and the excitation electrode EL12b are also respectively referred to as a thirteenth excitation electrode, a fourteenth excitation electrode, . . . , and a twenty-fourth excitation electrode. The interconnect L1a, the interconnect L2a, . . . , and the interconnect L14a are also respectively referred to as a first interconnect, a second interconnect, . . . , and a fourteenth interconnect. The interconnect L1b, the interconnect L2b, . . . , and the interconnect L14b are also respectively referred to as a fifteenth interconnect, a sixteenth interconnect, . . . , and a twenty-eighth interconnect.

Here, a problem that vibration energy of the double-ended tuning fork vibrator propagates to surrounding components will be considered. The components surrounding the double-ended tuning fork vibrator each have a natural vibration corresponding to a shape thereof. When the natural vibration and a propagating vibration are combined, the vibration energy of the double-ended tuning fork vibrator is absorbed by the natural vibration, and crystal impedance (CI) of the double-ended tuning fork vibrator increases. Accordingly, a phenomenon called DIP occurs in which a vibration frequency of the double-ended tuning fork vibrator changes. For example, in a physical quantity sensor using the double-ended tuning fork vibrator as a detection element for a physical quantity, when such DIP occurs, when a frequency generated in the vibration beams V1 and V2 changes, the physical quantity sensor detects a physical quantity such as acceleration based on the frequency changed by the DIP, so even though a physical quantity is not changed, the physical quantity is detected as being changed, and detection accuracy of the physical quantity sensor is lowered.

As a method for reducing the propagation of the vibration from the vibration beam of the double-ended tuning fork vibrator to the surrounding components by DIP, there is a method for disposing the excitation electrode away from a coupling portion between the vibration beam and the base. Accordingly, a moment generated in the base of the double-ended tuning fork vibrator can be reduced, and therefore the vibration propagating to the surrounding components can be reduced.

Figure 3:
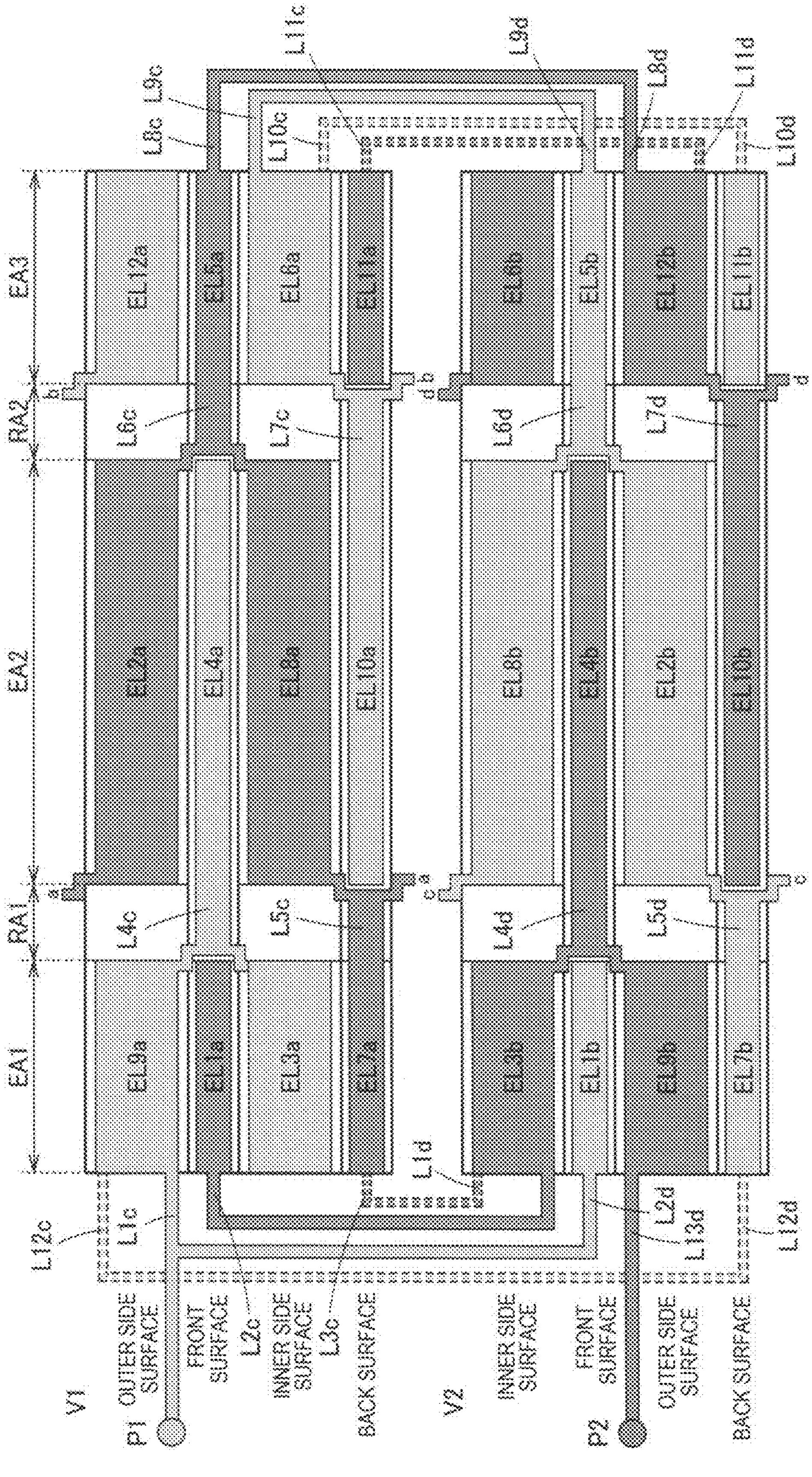
FIG. 3 is a developed view showing an interconnect relationship in a double-ended tuning fork vibrator according to the related art.

FIG. 3 is a developed view showing an interconnect relationship in a configuration example in the related art disclosed in JP-A-2014-42242. In the configuration example in the related art as well, similarly to the embodiment shown in FIGS. 1 and 2, in order to vibrate the double-ended tuning fork vibrator, the vibration beams V1 and V2 have three excitation regions EA1, EA2, and EA3 and two relay regions RA1 and RA2, but a manner of coupling of the excitation electrodes and shapes of the interconnects are different.

In the configuration example in the related art as well, as in the embodiment, the excitation electrodes are provided at the surfaces of the vibration beams V1 and V2, and the vibration beams vibrate by an inverse piezoelectric effect by alternately applying positive and negative voltages to the excitation electrodes. In the configuration example in the related art, unlike the embodiment, the vibration beams V1 and V2 are formed up to both the ends coupled to the bases B1 and B2. That is, in the configuration example in the related art shown in FIG. 3, regions corresponding to the first end region TA1 and the second end region TA2 in the embodiment are not defined, and the excitation electrodes provided in the first excitation region EA1 and the third excitation region EA3 are provided up to portions coupling the vibration beams V1 and V2 and the bases B1 and B2.

In the configuration example in the related art shown in FIG. 3, the shapes of the interconnects coupling the excitation electrodes are also different. In the embodiment shown in FIGS. 1 and 2, for example, the interconnect L3*a* and the interconnect L4*a* are provided side by side at the front surface of the first relay region RA1. However, in the example in the related art, an interconnect L4*c* having the same width as the excitation electrode EL4*a* in the second excitation region EA2 extends up to the first relay region RA1, and is coupled to the excitation electrodes at both side surfaces of the first excitation region EA1 at an end of the first relay region RA1. The back surface of the first relay region RA1 and the front and back surfaces of the second relay region RA2 have a similar configuration.

In the configuration example in the related art shown in FIG. 3, in the first excitation region EA1, the excitation electrode EL1*a*, the excitation electrode EL3*a*, the excitation electrode EL7*a*, and the excitation electrode EL9*a* extend up to a coupling portion between the vibration beam V1 and the base B1. In the third excitation region EA3, the excitation electrode EL5*a*, the excitation electrode EL6*a*, the excitation electrode EL11*a*, and the excitation electrode EL12*a* extend up to a coupling portion between the vibration beam V2 and the base B2. Thus, in the configuration in FIG. 3, the problem due to DIP caused by propagation of vibration energy of the vibration beams V1 and V2 may occur.

Figure 4:
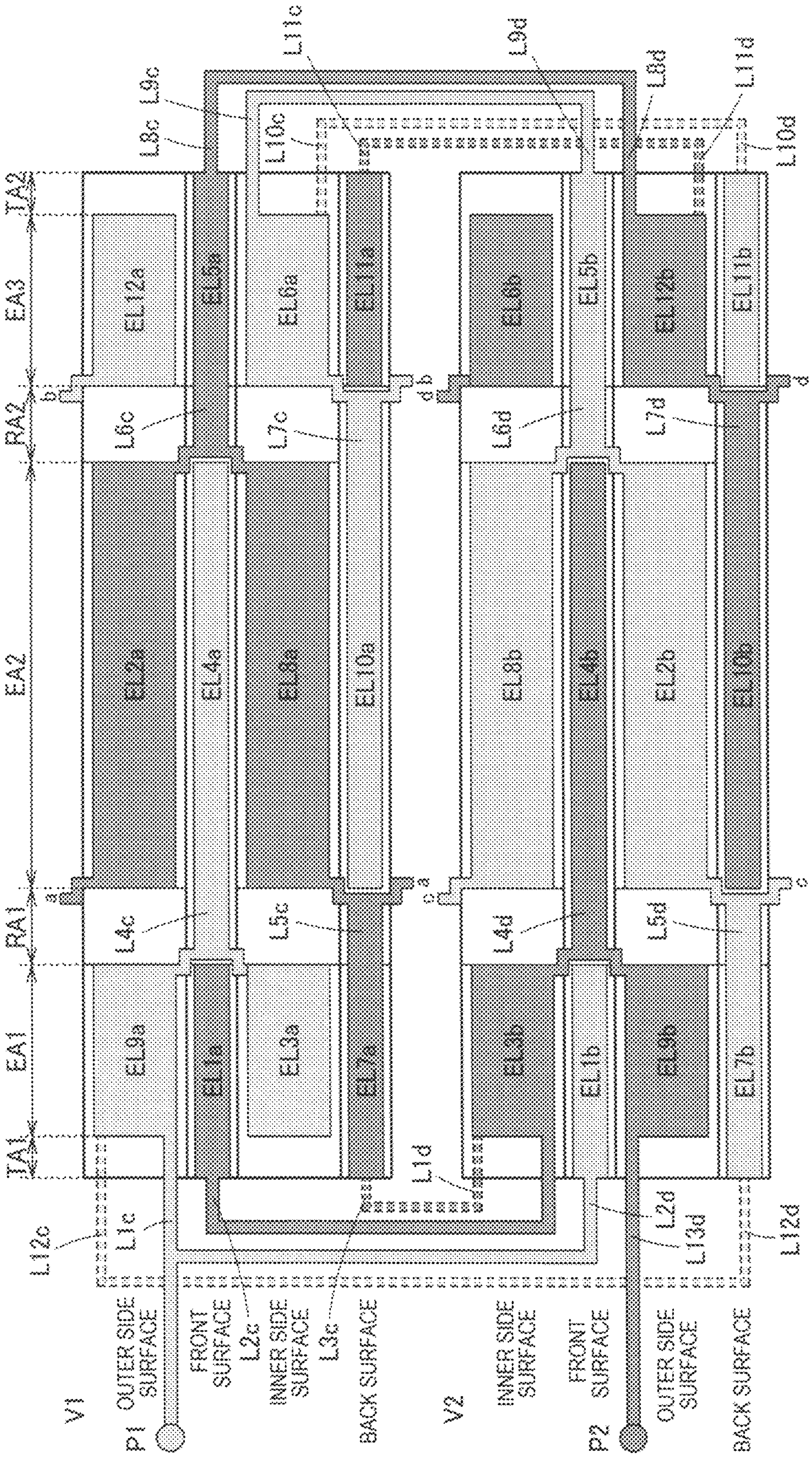
FIG. 4 is a developed view showing an interconnect relationship when excitation electrodes are provided away from a base in a double-ended tuning fork vibrator according to the related art.

FIG. 4 is a developed view showing that, in a configuration example in the related art, in order to prevent such a problem associated with DIP, a case where a method for disposing the above-described excitation electrode away from the coupling portion between the vibration beam V1 and the base B1 and the coupling portion between the vibration beam V2 and the base B2 is applied. As shown in FIG. 4, for example, in the first excitation region EA1, the excitation electrodes EL3*a* and EL9*a* are provided away from the coupling portion between the vibration beam V1 and the base B1. Similarly, the excitation electrodes EL3*b* and EL9*b* are provided away from a coupling portion between the vibration beam V2 and the base B1. Similarly, in the third excitation region EA3, the excitation electrode EL6*a*, the excitation electrode EL12*a*, the excitation electrode EL6*b*, and the excitation electrode EL12*b* are provided away from the base B2. Therefore, vibrations generated in the vibration beams V1 and V2 can be prevented from propagating to the bases B1 and B2 and the like.

Here, as shown in FIG. 4, for example, an interconnect L1*c* coupled to the pad P1 from the excitation electrode EL9*a* in the first excitation region EA1 is formed at the outer side surface, or a side of the outer side surface along the length direction of the vibration beam V1, that is, an edge portion of the vibration beam V1. When an interconnect that is thinner than the excitation electrode EL9*a* or the like and does not substantially generate a piezoelectric effect is formed at a side surface along the length direction of the vibration beam, the side surface is irradiated with light in photolithography obliquely with respect to the third direction DR3 or the fourth direction DR4. Therefore, there is a possibility that patterning accuracy of the interconnect is lowered due to reflection, diffraction, or the like of light. In general, in exposure of a portion corresponding to an edge of a three-dimensional object, reflection of light occurs, and formation of a pattern by photolithography becomes extremely difficult. Therefore, in the configuration example in the related art shown in FIG. 4, when the method for disposing the excitation electrode away from coupling portions between the vibration beams V1 and V2 and the bases B1 and B2 is applied as a method for preventing a problem caused by DIP, there is a possibility that the interconnect L1*c*, an interconnect L1*d*, and an interconnect L13*d* coupling the excitation electrode and the pad may be disconnected due to an influence of reflection of light or the like. The same applies to an interconnect L9*c*, an interconnect L10*c*, an interconnect L8*d*, and an interconnect L11*d* that couple the excitation electrodes. Therefore, the AC voltage applied to the pads P1 and P2 may not be correctly transmitted to the excitation electrodes, and the vibration of the double-ended tuning fork vibrator may not be appropriately induced.

In this regard, in the first configuration example of the embodiment shown in FIG. 1, each of the vibration beams V1 and V2 includes the first excitation region EA1, the second excitation region EA2, and the third excitation region EA3. Two interconnects having different polarities are provided at each of the front surface and the back surface of the first relay region RA1 between the first excitation region EA1 and the second excitation region EA2, the second relay region RA2 between the second excitation region EA2 and the third excitation region EA3, and the second end region TA2. For example, positive-side interconnects are coupled to the pad P1 via the interconnects L1*a* and L2*a*, and negative-side interconnects are coupled to the pad P2 via the interconnects L1*b* and L2*b*. Thus, conduction between the excitation electrodes can be achieved without providing an interconnect at the side surfaces of the vibration beams V1 and V2.

Therefore, when an AC voltage is applied to each of the excitation electrodes of the double-ended tuning fork vibrator 1 to vibrate the vibration beams V1 and V2, a moment is generated in the vicinity of the coupling portions between the vibration beams V1 and V2 and the bases B1 and B2, it is possible to prevent the vibration of the vibration beams V1 and V2 from being propagated to the bases B1 and B2 and the like, and thus it is possible to prevent DIP from occurring. Since there is no thin interconnect extending in the length direction of the vibration beams V1 and V2 at the side surfaces of the vibration beams V1 and V2, a possibility of disconnection when the interconnect is formed by photolithography is reduced, and the double-ended tuning fork vibrator 1 can be stably manufactured.

In the double-ended tuning fork vibrator 1 according to the embodiment, when the surfaces of the vibration beams V1 and V2 when viewed from the second direction DR2 or the fifth direction DR5 that is the opposite direction of the second direction DR2 are taken as side surfaces, all side surfaces of the first end region TA1 and the second end region TA2 are exposed.

According to the embodiment, since the excitation electrodes are not provided at the side surfaces of the first end region TA1 and the second end region TA2, it is possible to prevent an electric field from being applied to the first end region TA1 and the second end region TA2. Therefore, at the vibration beams V1 and V2, it is possible to prevent a vibration in a region close to the coupling portion with the bases B1 and B2.

Accordingly, it is possible to avoid a problem that a part of the vibration energy of the vibration beams leaks to the bases B1 and B2 and vibration frequencies of the vibration beams V1 and V2 decrease by transmitting the vibration of the vibration beams V1 and V2 to the bases B1 and B2.

In the double-ended tuning fork vibrator 1 according to the embodiment, the interconnect L1*a* coupling the excitation electrode EL1*a* and the pad P1 is provided at the front surface of the first end region TA1.

In this way, the interconnect L1*a* coupling the excitation electrode EL1*a* and the pad P1 can be provided at the same surface as the front surface of the vibration beam V1 at which the excitation electrode EL1*a* is provided without passing through the side surface of the vibration beam V1. Accordingly, it is easy to sufficiently ensure the interconnect width of the interconnect L1*a* in the second direction DR2, and when an interconnect pattern is formed by photolithography, it is possible to prevent a problem in which a thin interconnect pattern is not accurately formed due to an influence of reflection of light or the like and the interconnect is disconnected.

In the double-ended tuning fork vibrator 1 according to the embodiment, the interconnect L12*a* coupled to the excitation electrode EL12*a* extends in the first direction DR1 at the front surface of the second end region TA2.

In this way, the interconnect L12*a* coupled to the excitation electrode EL12*a* at the side surface does not extend along the first direction DR1 at the side surface of the vibration beam V1, and can come into contact with another excitation electrode. Accordingly, when an interconnect pattern is formed by photolithography, it is possible to prevent a problem in which a thin interconnect pattern is not accurately formed due to an influence of reflection of light or the like and the interconnect is disconnected, and it is easy to sufficiently ensure the interconnect width of the interconnect L12*a* in the second direction DR2.

In the double-ended tuning fork vibrator 1 according to the embodiment, a width of the interconnect L1*a* coupling the excitation electrode EL1*a* and the pad P1 and extending in an opposite direction of the first direction DR1 is equal to a width 4 the excitation electrode EL1*a*.

In this way, in the first end region TA1, since the excitation electrode EL1*a* and the interconnect L1*a* are provided at the front surface of the vibration beam V1 with the same width in the second direction DR2, the interconnect width of the interconnect L1*a* can be sufficiently ensured. Accordingly, when an interconnect pattern is formed by photolithography, it is possible to prevent a problem in which a thin interconnect pattern is not accurately formed due to an influence of reflection of light or the like and the interconnect is disconnected.

In the double-ended tuning fork vibrator 1 according to the embodiment, a width of the interconnect L11*a* extending from the excitation electrode EL5*a* in the first direction DR1 is smaller than a width of the excitation electrode EL5*a*.

In this way, the interconnect L11*a* coupling the excitation electrode EL5*a* at the vibration beam V1 and the excitation electrode EL6*b* at the vibration beam V2 and the interconnect L12*a* coupling the excitation electrode EL12*a* at the vibration beam V1 and the excitation electrode EL5*b* at the vibration beam V2 can be disposed side by side at the front surface of the second end region TA2. The interconnect L13*a* coupling the excitation electrode EL6*a* at the vibration beam V1 and the excitation electrode EL11*b* at the vibration beam V2 and the interconnect L14*a* coupling the excitation electrode EL11*a* at the vibration beam V1 and the excitation electrode EL12*b* at the vibration beam V2 can be disposed side by side at the back surface of the second end region TA2.

Figure 5:
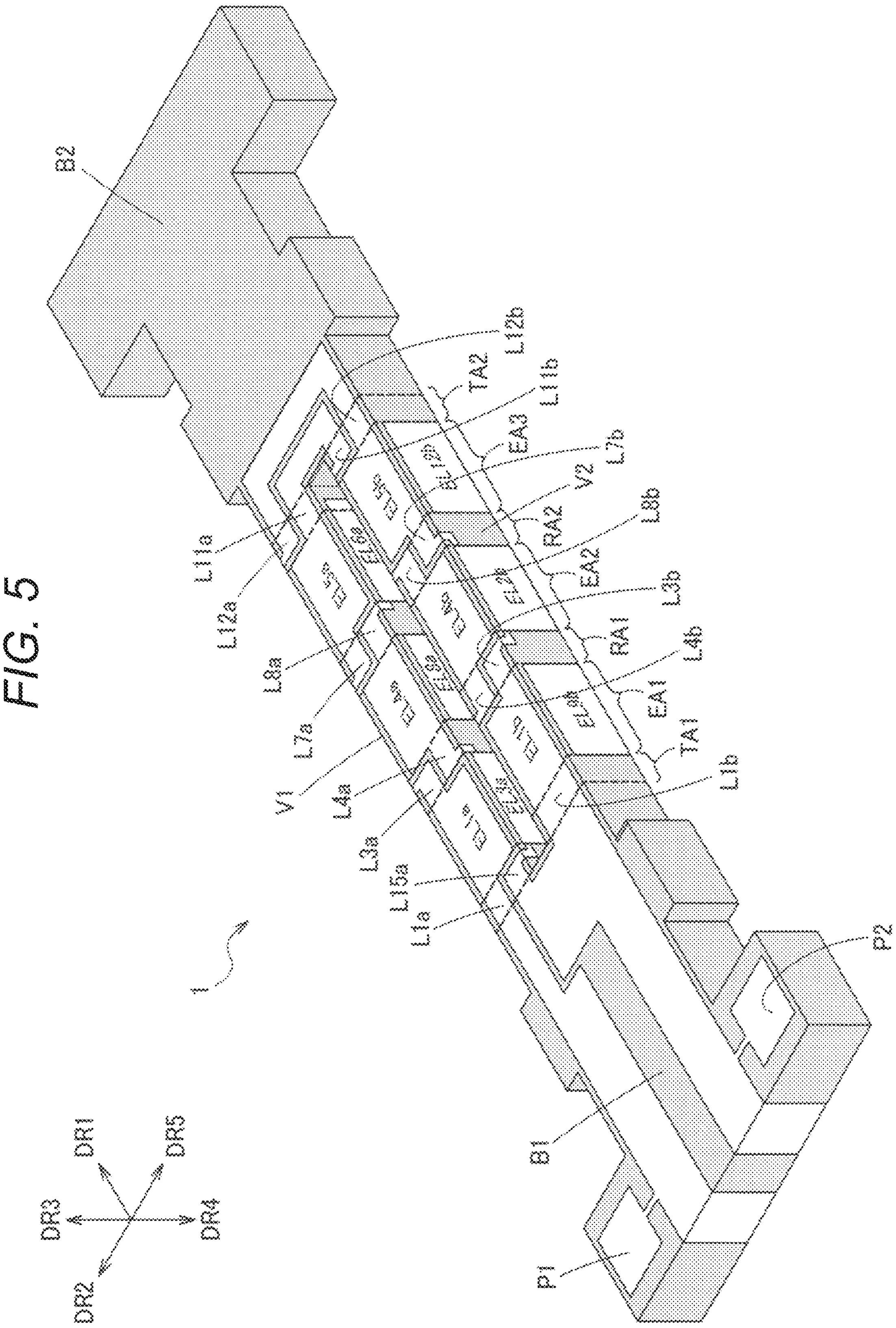
FIG. 5 is a perspective view of a second configuration example of the double-ended tuning fork vibrator according to the embodiment.

FIG. 5 is a second configuration example of the embodiment. In the second configuration example as well, at the vibration beams V1 and V2, an excitation region is divided into three regions, the first excitation region EA1, the second excitation region EA2, and the third excitation region EA3, as in the first configuration example. However, in the second configuration example, as in the developed view shown in FIG. 6, in addition to the front surfaces and the back surfaces of the first relay region RA1, the second relay region RA2, and the second end region TA2, two positive and negative interconnects are also provided at the front surface of the vibration beam V1 and the back surface of the vibration beam V2 in the first end region TA1. In the first end region TA1, the interconnect L1*a* and an interconnect L15*a* are disposed side by side at the front surface of the vibration beam V1, and the interconnect L2*b* and an interconnect L15*b* are disposed side by side at the back surface of the vibration beam V2. Accordingly, conduction of the entire excitation electrode can be achieved without disposing interconnects at the side surface of the first end region TA1 at the vibration beams V1 and V2.

According to the second configuration example, similarly to the first configuration example, it is possible to prevent the vibration of the vibration beams V1 and V2 from propagating to the bases B1 and B2 and the like. In addition, since no interconnect is provided at the edges of the vibration beams V1 and V2, a possibility of disconnection of the interconnect is reduced, and the double-ended tuning fork vibrator 1 can be stably manufactured. Further, according to the second configuration example, since contact is made by a plurality of paths for one excitation electrode, it is possible to reduce the influence of the disconnection.

In the double-ended tuning fork vibrator 1 according to the embodiment, the width of the interconnect L1*a* coupling the excitation electrode EL1*a* and the pad P1 is smaller than the width of the excitation electrode EL1*a*.

In this way, in the first end region TA1, the interconnect L1*a* coupling the excitation electrode EL1*a* and the pad P1 and the interconnect L15*a* coupling the excitation electrode EL3*a* and the pad P2 can be disposed side by side at the front surface of the vibration beam V1.

Figure 7:
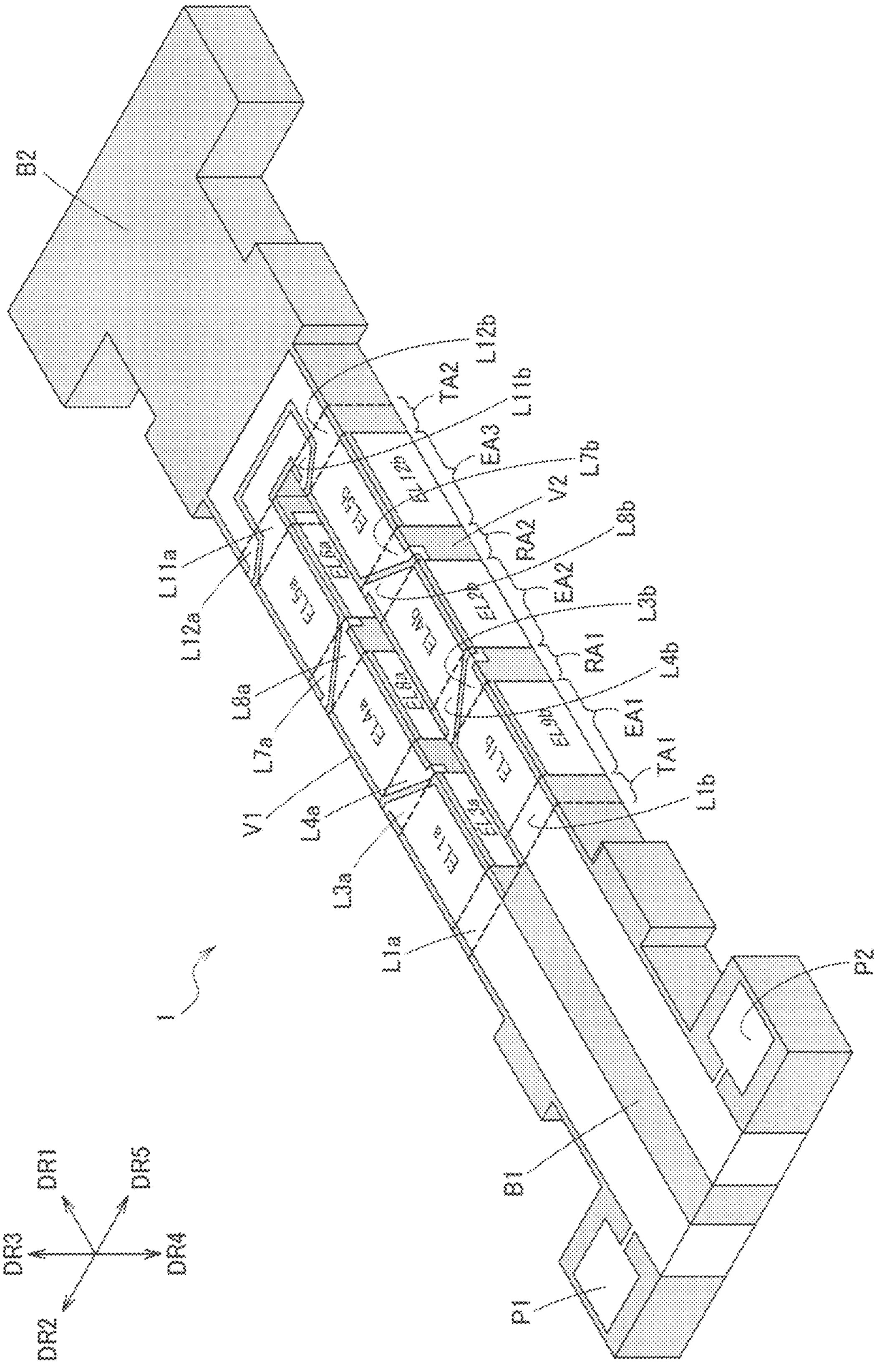
FIG. 7 is a perspective view of a third configuration example of the double-ended fork tuning vibrator according to the embodiment.

FIG. 7 is a modification of the 1 first configuration example of the embodiment. The modification shown in FIG. 7 is different from the first configuration example shown in FIG. 1 in the shapes of the interconnects provided at the front surface and the back surface of the first relay region RA1, the front surface and the back surface of the second relay region RA2, and the front surface and the back surface of the second end region TA2. Specifically, in the first relay region RA1, the shape of the interconnect L3*a* and the interconnect L4*a* provided at the front surface of the vibration beam V1 when viewed from the third direction DR3 is different from the first configuration example, and sides adjacent of the interconnect L3*a* and the interconnect L4*a* are obliquely provided with respect to the first direction DR1 that is the direction in which the vibration beam V1 extends. The same applies to the interconnect L5*a* and the interconnect L6*a* (not shown) provided at the back surface of the vibration beam V1. Similarly, in the second relay region RA2, adjacent sides of the interconnect L1*a* and the interconnect L8*a* are obliquely provided at the front surface of the vibration beam V1, and adjacent sides of the interconnect L9*a* and the interconnect L10*a* are obliquely provided at the back surface of the vibration beam V1 with respect to the direction in which the vibration beam V1 extends. The same applies to the interconnect L11 and the interconnect L12 at the front surface and the interconnect L13 and the interconnect L14 at the back surface of the vibration beam V1 in the second end region TA2. The same applies to the first relay region RA1, the second relay region RA2, and the second end region TA2 at the vibration beam V2. The modification shown in FIG. 7 can also be applied to the second configuration example. For example, in the developed view of the second configuration example of the embodiment shown in FIG. 6, adjacent sides of the interconnects at the front surface and the back surface of the first relay region RA1 and the second relay region RA2 can be obliquely provided with respect to the first direction DR1 that is a direction in which the vibration beam V1 extends.

By also adopting the modification shown in FIG. 7, when the interconnect pattern is formed by photolithography, as in the first configuration example and the second configuration example, it is possible to prevent the interconnect pattern from being incorrectly formed due to the influence of reflection of light or the like at a curved corner of the interconnect, and it is possible to prevent the interconnect from being disconnected.

2. Physical Quantity Sensor

Figure 8:
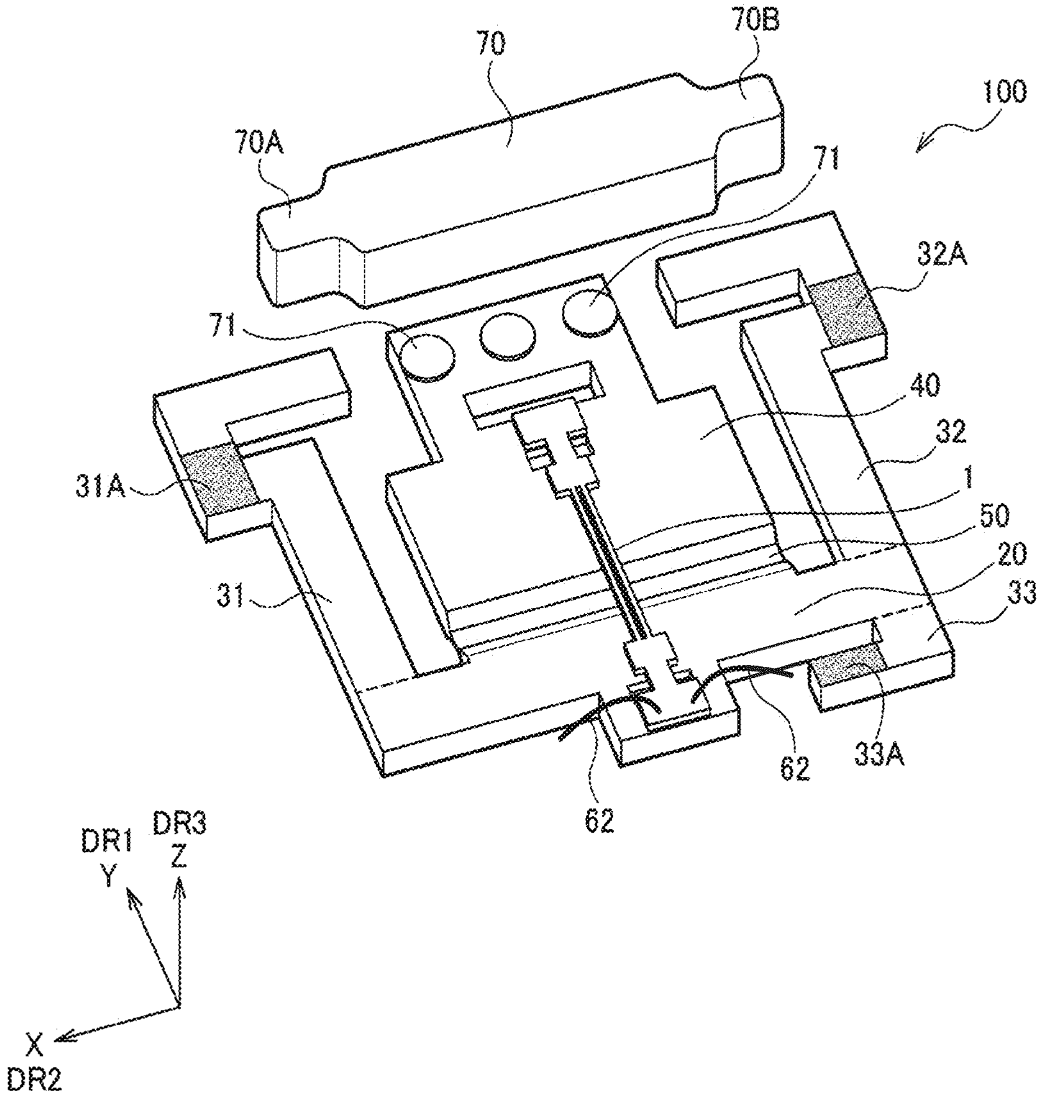
FIG. 8 is a perspective view of a physical quantity sensor according to the embodiment.
Figure 9:
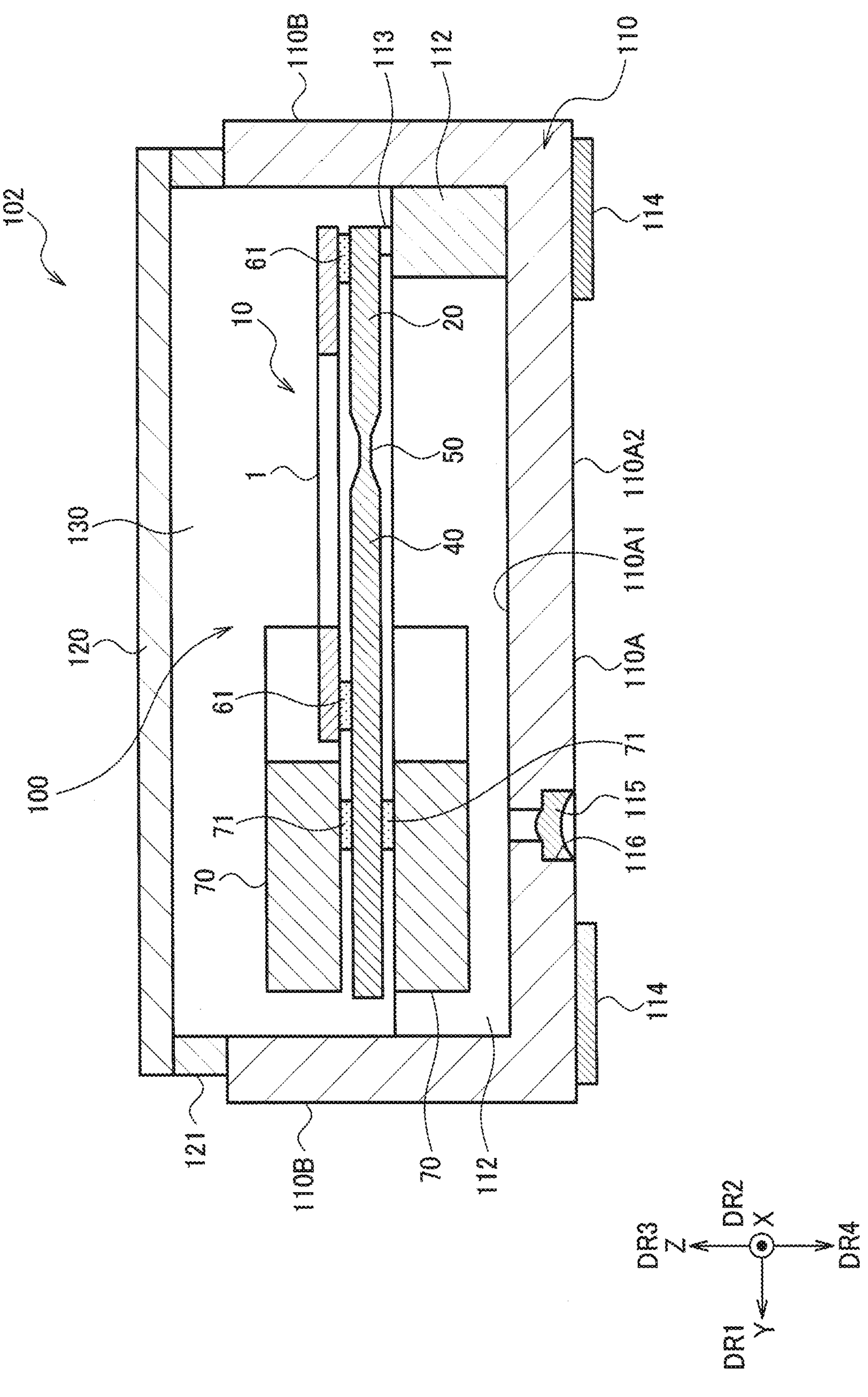
FIG. 9 is a schematic cross-sectional view of an inertial measurement device according to the embodiment.

FIG. 8 is a perspective view of a physical quantity sensor 100 according to the embodiment. The physical quantity sensor 100 includes a fixed portion 20, a support (31, 32, 33) supporting the fixed portion 20, a movable portion 40 that is movable relative to the fixed portion 20, a constricted portion 50, and the double-ended tuning fork vibrator 1. The support (31, 32, 33) includes, for example, three arms 31, 32, 33. The number of the arms 31, 32, 33 may be at least two. The arm 31, the arm 32, and the arm 33 are coupled to the fixed portion 20 at proximal ends, and preferably have a fixing region 31A, a fixing region 32A, and a fixing region 33A at distal ends, respectively. The constricted portion 50 is disposed between the fixed portion 20 and the movable portion 40, and couples the fixed portion 20 and the movable portion 40. The double-ended tuning fork vibrator 1 is the double-ended tuning fork vibrator 1 according to the embodiment described in FIG. 1 and the like, and detects, for example, acceleration, angular velocity, and pressure as a physical quantity. The double-ended tuning fork vibrator 1 is disposed across the constricted portion 50 in the plan view seen in a thickness direction of the fixed portion 20, that is, a −Z direction, and is attached to the fixed portion 20 and the movable portion 40 via joints 61 such as an adhesive to be described in FIG. 9. A mass portion 70 made of metal such as SUS or copper can be disposed at a free end side of the movable portion 40 that is a cantilever with the constricted portion 50 as a fulcrum. The mass portion 70 may be provided not only at a front surface side of the movable portion 40 as shown in FIG. 8 but also at a back surface side of the movable portion 40 as shown in FIG. 9. As shown in FIGS. 8 and 9, the mass portion 70 is attached to the movable portion 40 by joints 71 such as an adhesive. Although the mass portion 70 shown in FIG. 8 moves up and down together with the movable portion 40, both ends 70A and 70B of the mass portion 70 also function as stoppers that come into contact with the arm 31 and the arm 32 to prevent excessive amplitude.

The movable portion 40 is displaced with the constricted portion 50 as a fulcrum according to a physical quantity such as acceleration or pressure, which causes a stress in the double-ended tuning fork vibrator 1 attached to the fixed portion 20 and the movable portion 40. A resonance frequency of the double-ended tuning fork vibrator 1 changes according to the stress applied to the double-ended tuning fork vibrator 1. The physical quantity can be detected based on the change in the resonance frequency. The physical quantity sensor 100 according to the embodiment has a monolithic structure including the movable portion 40, the constricted portion 50, the fixed portion 20, and the support (31, 32, 33).

FIG. 9 is a schematic cross-sectional view of a physical quantity sensor device 102 in which the physical quantity sensor 100 shown in FIG. 8 is embedded. The physical quantity sensor device 102 includes a base 110 on which the physical quantity sensor 100 is mounted. In the embodiment, the base 110 is implemented as a package base including a bottom 110A and side walls 110B. The base 110 and a lid 120 form a package that accommodates the physical quantity sensor 100. The lid 120 is joined to an opening end of the base 110 via an adhesive 121. The bottom 110A of the base 110 is provided with steps 112 that are one step higher than an inner surface 110A1 of the bottom 110A along, for example, three side walls 110B among the four side walls 110B. The step 112 may protrude from an inner surface of the side wall 110B, may be integrated with or separate from the base 110, but is a part of the base 110. The physical quantity sensor 100 is fixed to the step 112 in the fixing regions 31A, 32A, and 33A with an adhesive 113. By using a resin adhesive such as an epoxy resin having a high elastic modulus as the adhesive 113, a stress and a strain generated at the time of joining can be absorbed, and a bad influence on the double-ended tuning fork vibrator 1 can be prevented.

In the embodiment, an electrode formed at the step 112 of the physical quantity sensor device 102 shown in FIG. 9 can be coupled by wire bonding 62 of the double-ended tuning fork vibrator 1 shown in FIG. 8. In this case, it is not necessary to form an electrode pattern on the fixed portion 20. The electrode pattern provided on the fixed portion 20 may be coupled to the electrode formed at the step 112 of the base 110 via a conductive adhesive without adopting the wire bonding 62.

The base 110 is provided at an outer surface 110A2 of the bottom 110A, and has an external terminal 114 used when the base 110 is mounted on a circuit board 210 shown in FIG. 10 to be described later. The external terminal 114 is electrically coupled to the double-ended tuning fork vibrator 1 via an interconnect, an electrode, and the like (not shown).

For example, the bottom 110A is provided with a sealer 115 that seals a cavity 130 in a package formed by the base 110 and the lid 120. The sealer 115 is provided in a through hole 116 formed in the base 110. The sealer 115 is provided by disposing a sealing material in the through hole 116, heating and melting the sealing material, and then solidifying the sealing material. The sealer 115 hermetically seals an inside of the package.

The physical quantity sensor 100 according to the embodiment includes the double-ended tuning fork vibrator 1, the joint 61 coupled to one end of the double-ended tuning fork vibrator 1, and the mass portion 70 provided at the double-ended tuning fork vibrator 1. In this way, an effect achieved by the double-ended tuning fork vibrator 1 described above is also achieved in the physical quantity sensor 100.

3. Inertial Measurement Device

Figure 10:
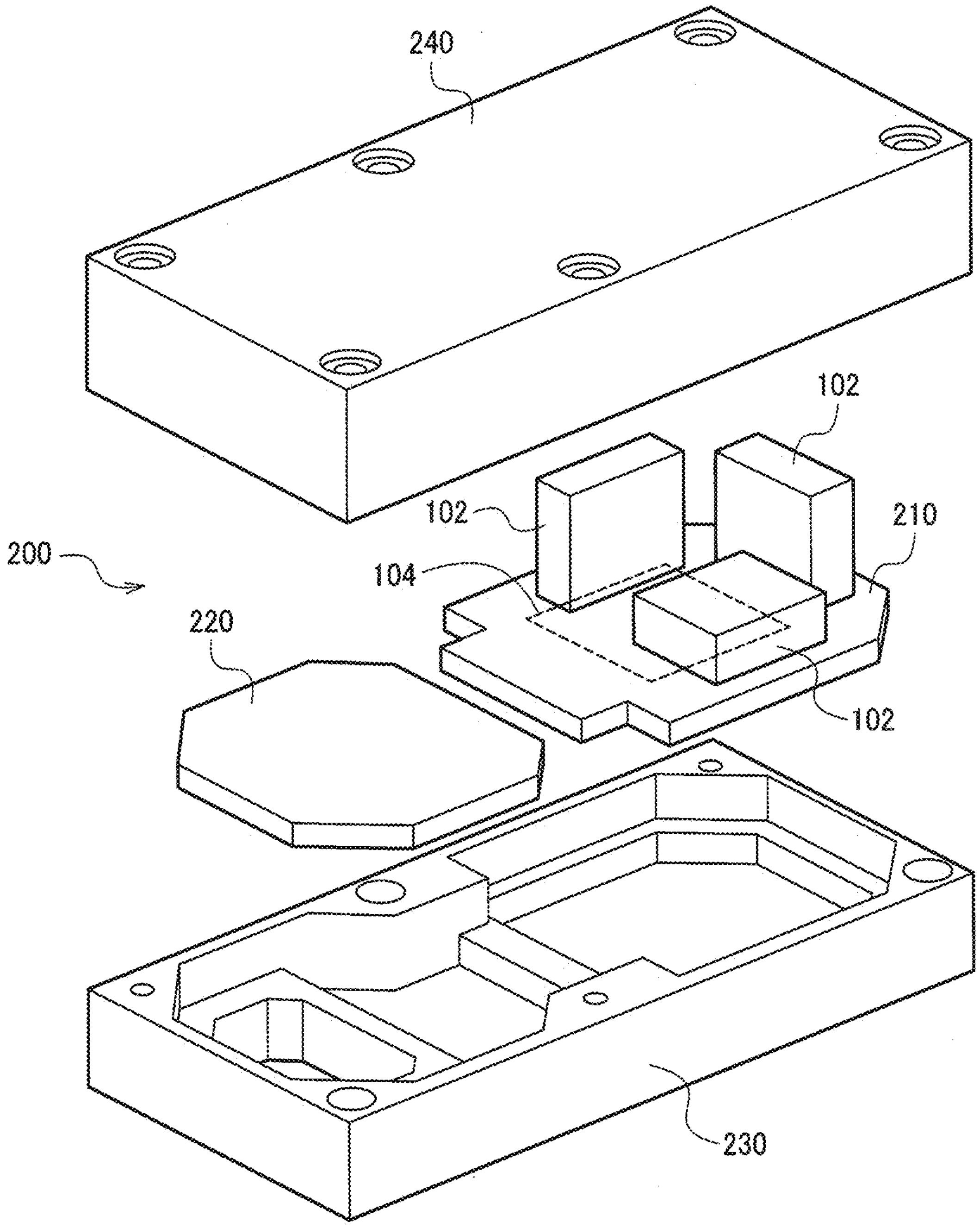
FIG. 10 is an assembly exploded perspective view of the inertial measurement device according to the embodiment.

FIG. 10 is an assembly exploded perspective view of an inertial measurement device 200 including three physical quantity sensor devices 102. The physical quantity sensor device 102 is, for example, a uniaxial physical quantity sensor device. The inertial measurement device 200 includes the circuit board 210 on which three physical quantity sensor devices 102 are mounted, a connector board 220, a package base 230, and a lid 240. The three physical quantity sensor devices 102 have detection axes along three orthogonal axes, and detect physical quantities in the three axes. The circuit board 210 is electrically coupled to the connector board 220. The circuit board 210 and the connector board 220 are accommodated and held in a package formed by the package base 230 and the lid 240.

A processor 104 is mounted on a lower surface of the circuit board 210. The processor 104 performs processing based on a detection signal output from each physical quantity sensor 100. The processor 104 is, for example, a control IC such as a micro controller unit (MCU), includes a built-in storage including a nonvolatile memory, A/D converter, and the like, and controls each part of the inertial measurement device 200. A plurality of other electronic components are also mounted on the circuit board 210.

As described above, the inertial measurement device 200 according to the embodiment includes the physical quantity sensor 100 described in FIG. 8 and the like. The physical quantity detected by the physical quantity sensor 100 is, for example, acceleration, speed, displacement amount, angular velocity, tilt angle, or pressure. The physical quantity is, for example, a physical quantity in the third direction DR3, and when the physical quantity sensor 100 is an acceleration sensor, the physical quantity sensor 100 detects acceleration in the third direction DR3. When the physical quantity sensor 100 is an angular velocity sensor such as a gyro sensor, the physical quantity sensor 100 detects an angular velocity around the third direction DR3, for example. The physical quantity sensor 100 may be a pressure sensor, a tilt sensor, a MEMS switch, or the like.

By applying the double-ended tuning fork vibrator 1 according to the embodiment to a double-ended tuning fork vibrator of the physical quantity sensor 100 mounted on the inertial measurement device 200 in this manner, it is possible to prevent occurrence of DIP, to detect the physical quantity such as acceleration with high accuracy, and to perform temperature correction with high accuracy. For example, it can be suitably used for applications that detect minute vibrations, such as earthquake measurement.

The inertial measurement device 200 in the embodiment includes the physical quantity sensor 100 described above and the processor 104 configured to process a detection signal output from the physical quantity sensor 100.

In this way, the effect achieved by the double-ended tuning fork vibrator 1 described above is also achieved in the inertial measurement device 200.

The double-ended tuning fork vibrator includes: the pair of bases; and the pair of vibration beams extending in the first direction and provided side by side in the second direction orthogonal to the first direction. Both the ends of the pair of the vibration beams are coupled to the pair of bases. The vibration beam has the first end region, the first excitation region, the first relay region, the second excitation region, the second relay region, the third excitation region, and the second end region in this order toward the first direction. A plurality of excitation electrodes provided at the vibration beam are selectively disposed at the surfaces of the first excitation region, the second excitation region, and the third excitation region. For the plurality of excitation electrodes, when the surface of the vibration beam when viewed from the third direction orthogonal to the first direction and the second direction is the front surface and the surface when viewed from the fourth direction that is the opposite direction of the third direction is the back surface, the third interconnect coupling the first excitation electrode in the first excitation region and the second excitation electrode in the second excitation region and the fourth interconnect coupling the third excitation electrode in the first excitation region and the fourth excitation electrode in the second excitation region are provided at the front surface of the first relay region. The seventh interconnect coupling the second excitation electrode in the second excitation region and the fifth excitation electrode in the third excitation region and the eighth interconnect coupling the fourth excitation electrode in the second excitation region and the sixth excitation electrode in the third excitation region are provided at the front surface of the second relay region. The fifth interconnect coupling the seventh excitation electrode in the first excitation region and the eighth excitation electrode in the second excitation region and the sixth interconnect coupling the ninth excitation electrode in the first excitation region and the tenth excitation electrode in the second excitation region are provided at the back surface of the first relay region. The ninth interconnect coupling the eighth excitation electrode in the second excitation region and the eleventh excitation electrode in the third excitation region and the tenth interconnect coupling the tenth excitation electrode in the second excitation region and the twelfth excitation electrode in the third excitation region are provided at the back surface of the second relay region.

According to the embodiment, the pair of vibration beams can vibrate as the double-ended tuning fork vibrator by coupling both the ends thereof to the pair of bases.

In this way, coupling from the first excitation electrode in the first excitation region to the second excitation electrode in the second excitation region is coupling from the front surface of the vibration beam to the outer side surface of the vibration beam, and coupling from the third excitation electrode in the first excitation region to the fourth excitation electrode in the second excitation region is coupling from the inner side surface of the vibration beam to the front surface of the vibration beam. Therefore, the third interconnect and the fourth interconnect can be provided side by side at the front surface of the first relay region.

Coupling from the second excitation electrode in the second excitation region to the fifth excitation electrode in the third excitation region is coupling from the outer side surface of the vibration beam to the front surface of the vibration beam. Coupling from the fourth excitation electrode in the second excitation region to the sixth excitation electrode in the third excitation region is coupling from the front surface of the vibration beam to the inner side surface of the vibration beam. Therefore, the seventh interconnect and the eighth interconnect can be provided side by side at the front surface of the second relay region.

Coupling from the seventh excitation electrode in the first excitation region to the eighth excitation electrode in the second excitation region is coupling from the back surface of the vibration beam to the inner side surface of the vibration beam. Coupling from the ninth excitation electrode in the first excitation region to the tenth excitation electrode in the second excitation region is coupling from the outer side surface of the vibration beam to the back surface of the vibration beam. Therefore, the fifth interconnect and the sixth interconnect can be provided side by side at the back surface of the first relay region.

Coupling from the eighth excitation electrode in the second excitation region to the eleventh excitation electrode in the third excitation region is coupling from the inner side surface of the vibration beam to the back surface of the vibration beam. Coupling from the tenth excitation electrode in the second excitation region to the twelfth excitation electrode in the third excitation region is coupling from the back surface of the vibration beam to the outer side surface of the vibration beam. Therefore, the ninth interconnect and the tenth interconnect can be provided side by side at the back surface of the second relay region.

Accordingly, in the first relay region and the second relay region, the excitation electrodes can be coupled to each other without disposing the interconnect at the edge of the vibration beam. Therefore, when the interconnect patterns in the first relay region and the second relay region are formed by photolithography, it is possible to prevent the interconnect from being disconnected due to an influence of reflection of light or the like.

In the double-ended tuning fork vibrator according to the embodiment, when the surface of the vibration beam when viewed from the second direction or the fifth direction that is the opposite direction of the second direction is taken as the side surface, all the side surfaces of the first end region and the second end region are exposed.

According to the embodiment, since the excitation electrodes are not provided at the side surfaces of the first end region and the second end region, it is possible to prevent an electric field from being applied to the first end region and the second end region. Therefore, it is possible to prevent a vibration in a region of the vibration beam close to the coupling portion with the base.

In the double-ended tuning fork vibrator according to the embodiment, the first interconnect coupling the first excitation electrode and the pad is provided at the front surface of the first end region.

In this way, the first interconnect coupling the first excitation electrode and the pad can be provided at the front surface of the vibration beam at which the first excitation electrode is provided without passing through the edge of the vibration beam.

In the double-ended tuning fork vibrator according to the embodiment, the twelfth interconnect coupled to the twelfth excitation electrode extends in the first direction at the front surface of the second end region.

In this way, the twelfth interconnect coupled to the twelfth excitation electrode at the side surface does not extend in the first direction at the side surface of the vibration beam, and can come into contact with another excitation electrode.

In the double-ended tuning fork vibrator according to the embodiment, the width of the first interconnect coupling the first excitation electrode and the pad and extending in the opposite direction of the first direction is equal to the width of the first excitation electrode.

In this way, the interconnect width of the first interconnect provided at the front surface of the vibration beam in the first end region can be sufficiently ensured.

In the double-ended tuning fork vibrator according to the embodiment, the width of the first interconnect coupling the first excitation electrode and the pad and extending in the opposite direction of the first direction is smaller than the width of the first excitation electrode.

In this way, the first interconnect coupling the first excitation electrode and the pad and the fifteenth interconnect coupling the third excitation electrode and the pad can be disposed side by side at the front surface of the vibration beam in the first end region.

In the double-ended tuning fork vibrator according to the embodiment, the width of the eleventh interconnect extending also in the first direction from the fifth excitation electrode is smaller than the width of the fifth excitation electrode.

In this way, two interconnects coupling the excitation electrode at one vibration beam and the excitation electrode at the other vibration beam can be disposed side by side at the front surface and the back surface of the second end region.

In this way, the eleventh interconnect coupling the fifth excitation electrode and the eighteenth excitation electrode and the twelfth interconnect coupling the twelfth excitation electrode and the seventeenth excitation electrode can be disposed side by side at the front surface of the second end region. The thirteenth interconnect coupling the sixth excitation electrode and the twenty-third excitation electrode and the fourteenth interconnect coupling the eleventh excitation electrode and the twenty-fourth excitation electrode can be disposed side by side at the back surface of the second end region.

The physical quantity sensor according to the embodiment includes: the double-ended tuning fork vibrator described above; the fixed portion coupled to one end of the double-ended tuning fork vibrator described above; and the movable portion coupled to the other end of the double-ended tuning fork vibrator described above and movable relative to the fixed portion.

The inertial measurement device according to the embodiment includes: the physical quantity sensor described above; and a processor configured to process a detection signal output from the physical quantity sensor described above.

Although the embodiment is described in detail above, it can be easily understood by those skilled in the art that many modifications are possible without substantially departing from the novel matters and effects of the present disclosure. Accordingly, all such modifications are within the scope of the present disclosure. For example, a term described at least once together with a different term having a broader meaning or the same meaning in the description or the drawings can be replaced with the different term at any place in the description or the drawings. All combinations of the embodiment and the modifications are also within the scope of the present disclosure. Configurations, operations, and the like of the double-ended tuning fork vibrator, the physical quantity sensor, and the inertial measurement device are not limited to those described in the embodiment, and various modifications are possible. Ordinal numbers such as “first” and “second” in the present disclosure are merely labels for distinguishing a plurality of different elements, and do not necessarily have a meaning as an ordinal number for specifying an arrangement or an order.

What is claimed is:

1. A double-ended tuning fork vibrator comprising:

when three directions orthogonal to one another are defined as a first direction, a second direction, and a third direction, a first base and a second base; and a first vibration beam extending in the first direction, and a second vibration beam extending in the first direction and disposed side by side with the first vibration beam in the second direction, wherein the first base is coupled to one end of the first vibration beam and one end of the second vibration beam, the second base is coupled to the other end of the first vibration beam and the other end of the second vibration beam, each of the first vibration beam and the second vibration beam has a first end region, a first excitation region, a first relay region, a second excitation region, a second relay region, a third excitation region, and a second end region in this order toward the first direction, a plurality of excitation electrodes provided at the first vibration beam and the second vibration beam are selectively disposed on surfaces of the first excitation region, the second excitation region, and the third excitation region, and when one surface of each of the first vibration beam and the second vibration beam orthogonal to the third direction is a front surface and the other surface is a back surface, a third interconnect coupling a first excitation electrode disposed in the first excitation region and a second excitation electrode disposed in the second excitation region and a fourth interconnect coupling a third excitation electrode disposed in the first excitation region and a fourth excitation electrode disposed in the second excitation region are provided on a front surface of the first relay region side by side and parallel with one another along the first direction, a seventh interconnect coupling the second excitation electrode and a fifth excitation electrode disposed in the third excitation region and an eighth interconnect coupling the fourth excitation electrode and a sixth excitation electrode disposed in the third excitation region are provided on a front surface of the second relay region side by side and parallel with one another along the first direction, a fifth interconnect coupling a seventh excitation electrode disposed in the first excitation region and an eighth excitation electrode disposed in the second excitation region and a sixth interconnect coupling a ninth excitation electrode disposed in the first excitation region and a tenth excitation electrode disposed in the second excitation region are provided on a back surface of the first relay region side by side and parallel with one another along the first direction, and a ninth interconnect coupling the eighth excitation electrode and an eleventh excitation electrode disposed in the third excitation region and a tenth interconnect coupling the tenth excitation electrode and a twelfth excitation electrode disposed in the third excitation region are provided on a back surface of the second relay region side by side and parallel with one another along the first direction.

2. The double-ended tuning fork vibrator according to claim 1, wherein when a surface orthogonal to the second direction of each of the first vibration beam and the second vibration beam is defined as a side surface, side surfaces of the first end region and the second end region are exposed.

3. The double-ended tuning fork vibrator according to claim 1, further comprising:

a pad disposed at the first base, wherein a first interconnect coupling the first excitation electrode and the pad is provided on a front surface of the first end region.

4. The double-ended tuning fork vibrator according to claim 3, wherein a width of the first interconnect along the second direction is equal to a width of the first excitation electrode along the second direction.

5. The double-ended tuning fork vibrator according to claim 3, wherein a width of the first interconnect along the second direction is smaller than a width of the first excitation electrode along the second direction.

6. The double-ended tuning fork vibrator according to claim 1, wherein a twelfth interconnect coupled to the twelfth excitation electrode and disposed on a front surface of the second end region extends in the first direction.

7. The double-ended tuning fork vibrator according to claim 6, wherein a width of an eleventh interconnect along the second direction is smaller than a width of the fifth excitation electrode along the second direction, the eleventh interconnect extending from the fifth excitation electrode in the first direction.

8. A physical quantity sensor comprising:

the double-ended tuning fork vibrator according to claim 1;

a fixed portion coupled to one end side of the double-ended tuning fork vibrator; and a movable portion coupled to the other end side of the double-ended tuning fork vibrator.

9. An inertial measurement device comprising:

the physical quantity sensor according to claim 8; and a processor configured to process a detection signal output from the physical quantity sensor.

10. The inertial measurement device according to claim 9, wherein a physical quantity detected by the physical quantity sensor is any one of acceleration, speed, displacement amount, angular velocity, tilt angle, and pressure.

11. The double-ended tuning fork vibrator according to claim 1, wherein the first vibration beam includes the third interconnect and the fourth interconnect on the front surface of the first relay region, and the third interconnect and the fourth interconnect do not cover an edge of the first vibration beam in a region extending along a length direction of the first vibration beam.

* * * * *